US011912057B2

(12) United States Patent
Gettens et al.

(10) Patent No.: US 11,912,057 B2
(45) Date of Patent: Feb. 27, 2024

(54) SURFACE APPLIED MICRO-OPTIC ANTI-COUNTERFEIT SECURITY DEVICE

(71) Applicant: CRANE & CO., INC., Dalton, MA (US)

(72) Inventors: Nancy J. Gettens, Waban, MA (US); Pearl N. Dickerson, New Boston, NH (US); Michael McAllister, Windham, NH (US); David L. Peters, Amherst, NH (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 17/419,212

(22) PCT Filed: Dec. 27, 2018

(86) PCT No.: PCT/US2018/067765
§ 371 (c)(1),
(2) Date: Jun. 28, 2021

(87) PCT Pub. No.: WO2020/139359
PCT Pub. Date: Jul. 2, 2020

(65) Prior Publication Data

US 2022/0072891 A1 Mar. 10, 2022

(51) Int. Cl.
*B42D 25/00* (2014.01)
*B42D 25/324* (2014.01)
(Continued)

(52) U.S. Cl.
CPC ........... *B42D 25/324* (2014.10); *B42D 25/29* (2014.10); *B42D 25/378* (2014.10); *B42D 25/425* (2014.10); *B42D 25/47* (2014.10)

(58) Field of Classification Search
CPC ..................................................... B42D 25/324
See application file for complete search history.

(56) References Cited

U.S. PATENT DOCUMENTS 7,333,268 B2 * 2/2008 Steenblik ............... B42D 25/00 359/619
7,468,842 B2 * 12/2008 Steenblik ............... B42D 25/36 359/619
(Continued)

FOREIGN PATENT DOCUMENTS

CN 101379423 A 3/2009
CN 102092210 A 6/2011
(Continued)

OTHER PUBLICATIONS

International Search Report and Written Opinion of the International Searching Authority dated Mar. 25, 2019 in connection with International Application No. PCT/US2018/067765, 15 pages.
(Continued)

*Primary Examiner* — Kyle R Grabowski

(57) ABSTRACT

A security device made up of a security film (130) having (i) an array of image elements (103); (ii) an array of focusing elements (106); and (iii) at least one anti-viscid agent (115), is provided. The array of focusing elements and the array of image elements are disposed relative to each other such that a synthetic image is projected by the security film when at least a portion of the array of image elements are viewed through at least a portion of the array of focusing elements. The anti-viscid agent is coupled with the array of focusing elements.

18 Claims, 5 Drawing Sheets

(51) Int. Cl.

| | |
|---|---|
| ***B42D 25/29*** | (2014.01) |
| ***B42D 25/378*** | (2014.01) |
| ***B42D 25/425*** | (2014.01) |
| ***B42D 25/47*** | (2014.01) |

(56) References Cited

U.S. PATENT DOCUMENTS

| | | | | |
|---|---|---|---|---|
| 2007/0095224 | A1 | 5/2007 | Brehm et al. | |
| 2007/0273143 | A1 | 11/2007 | Crane et al. | |
| 2008/0118872 | A1* | 5/2008 | Sreenivasan | H01L 21/3088 430/323 |
| 2010/0308571 | A1 | 12/2010 | Steenblik et al. | |
| 2011/0027538 | A1* | 2/2011 | Hoffmann | G02B 3/0031 428/173 |
| 2011/0170196 | A1 | 7/2011 | Tanaka | |
| 2013/0270813 | A1* | 10/2013 | Hoffmuller | B42D 25/00 29/527.2 |
| 2014/0376091 | A1 | 12/2014 | Jordan et al. | |
| 2015/0050593 | A1 | 2/2015 | Adachi et al. | |
| 2015/0217550 | A1* | 8/2015 | Gosnell | B44C 1/172 428/141 |
| 2017/0210161 | A1* | 7/2017 | Cape | B42D 25/328 |
| 2018/0361777 | A1 | 12/2018 | Fuhse et al. | |

FOREIGN PATENT DOCUMENTS

| | | | |
|---|---|---|---|
| CN | 104118236 | A | 10/2014 |
| CN | 107921742 | A | 4/2018 |
| JP | H11-65381 | A | 3/1999 |
| JP | 2000-127617 | A | 5/2000 |
| JP | 2003-240910 | A | 8/2003 |
| JP | 2008-545550 | A | 12/2008 |
| JP | 2009-291996 | A | 12/2009 |
| JP | 2016-043551 | A | 4/2016 |
| JP | 2017-196880 | A | 11/2017 |
| JP | 2018-156110 | A | 10/2018 |
| KR | 10-1718168 | B1 | 3/2017 |
| KR | 10-2018-0109066 | A | 10/2018 |
| RU | 2602486 | C2 | 11/2016 |
| RU | 2621558 | C2 | 6/2017 |
| WO | 2017138536 | A1 | 8/2017 |
| WO | 2018178000 | A1 | 10/2018 |

OTHER PUBLICATIONS

Official Action and Search Report dated Mar. 5, 2022, in connection with Russian Application No. 2021122014/03(046048), 23 pages.

Office Action dated Sep. 7, 2022, in connection with Brazilian Application No. 112021012201-0, 8 pages.

The First Office Action dated Jul. 18, 2022, in connection with Chinese Application No. 201880100501.3, 21 pages.

Supplementary Partial European Search Report dated Jul. 15, 2022, in connection with European Application No. 18944475.5, 14 pages.

Notice of Reasons for Refusal dated Aug. 30, 2022, in connection with Japanese Application No. 2021-537941, 10 pages.

Official Action dated Aug. 3, 2022, in connection with Russian Application No. 2021122014/03(046048), 15 pages.

Supplementary European Search Report dated Nov. 30, 2022, in connection with European Application No. 18944475.5, 14 pages.

Communication pursuant to Rules 70(2) and 70a(2) EPC dated Dec. 20, 2022, in connection with European Application No. 18944475.5, 1 page.

Examination report dated Jan. 16, 2023, in connection with Indian Application No. 202127024983, 6 pages.

Final Notification of Reasons for Refusal dated Jan. 10, 2023, in connection with Japanese Application No. 2021-537941, 5 pages.

Notification dated Dec. 27, 2022, in connection with Russian Application No. 2021122014/03(046048), 10 pages.

Notice on the Result of Substantive Examination dated Feb. 27, 2023, in connection with Indonesian Application No. P00202105671, 6 pages.

Second Office Action dated Mar. 23, 2023, in connection with Chinese Application No. 201880100501.3, 14 pages.

Report Upon Technical Examination dated Jun. 29, 2023, in connection with Brazilian Patent Application No. 112021012201-0, 8 pages.

Notification to Grant Patent Right for Invention dated Aug. 16, 2023, in connection with Chinese Patent Application No. 201880100501.3, 6 pages.

Request for the Submission of an Opinion dated Aug. 22, 2023, in connection with Korean Patent Application No. 10-2021-70200006, 23 pages.

Decision to Grant dated Jun. 20, 2023, in connection with Russian Application No. 2021122014/03(046048), 19 pages.

* cited by examiner

SURFACE APPLIED MICRO-OPTIC ANTI-COUNTERFEIT SECURITY DEVICE

CROSS-REFERENCE TO RELATED APPLICATIONS

This application is a 371 National Stage of International Application No. PCT/US2018/067765, filed Dec. 27, 2018, the disclosures of which are herein incorporated by reference in their entirety.

TECHNICAL FIELD

Certain embodiments according to this disclosure relate to (i) articles of manufacture suitable for use in securing (i.e., authenticating or aestheticizing) high value or high security products; such high value or high security products being collectively referred to herein as secured products, and the articles of manufacture referred to herein as a security device. Certain embodiments according to this disclosure relate to methods of securing (i.e., authenticating or aestheticizing) a secured product. Additionally, the present invention also relates to (iii) a secured product, (iv) a secured product formed by the method of applying a security device to a secured product and (v) a method of producing the security device and (vi) a security device formed by this method. In a further aspect, this disclosure relates to (vii) the use of the security device for securing a secured product.

BACKGROUND

Secured products include high security products and high value products. High security products themselves include, without limitation, security documents, such as banknotes, checks, and government identification documents such as licenses, security passes, passports, official government letterheads and the like. The aforementioned high value products themselves can include branded products such as home goods, personal products, apparel, and high-tech products. These secured products may rely on various authentication tools to help mitigate the proliferation of counterfeits. Among the various authentication tools available to manufacturers/users of secured products are watermarks, specialty fibers, embedded threads, and windowed threads.

Watermarks function as authentication tools by presenting obstacles to would-be counterfeiters who often rely on contemporary and advanced printing and photocopying techniques to duplicate/copy authentic banknotes. For example, users of banknotes rely on the presence of certain watermark indicia, for example, depictions of people, numbers, letters, symbols and/or landscapes in order to authenticate those high security documents. Such watermark indicia are generally incorporated into the banknote during the manufacturing process of the paper used to form the banknote. In certain cases, the watermark indicia is imbued with certain motility/mobility effects whereby subtle or more obvious changes in an observer's viewpoint, relative to the secured product, results in an observable change in the appearance or location of the indicia. For example, viewing the watermark indicia in reflected light, an observer will see that the indicia has a first appearance while viewing the watermark indicia in transmitted light (i.e., light transmitting through a paper when the paper is held between an observer and a light source) provides a second appearance. However, watermarks can present certain technical and functional limitations. For example, in order to satisfy some criteria for effectiveness, watermarks may need to incorporate high definition details, which can often be very difficult to consistently produce across billions of banknotes. Accordingly, without such high definition details, counterfeiters are better equipped to produce authentic-looking banknotes with commercially available high definition and high resolution printers to produce counterfeit banknotes.

Specialty fibers are another authentication tool that is frequently used to secure—whether through security or aesthetics—high security documents. To authenticate banknotes, for example, fibers are added to the paper pulp during manufacturing such that the resulting paper has a distribution of fibers with a particular color or a particular machine detectable signal. However, most incorporation of fibers into paper is through a random distribution throughout the paper's bulk and/or over the paper's surface area. As such, from banknote to banknote in a set of billions that are otherwise relatively identical, the fiber security feature varies. This variability within a set of secured products enables counterfeiters to produce counterfeited versions that are not readily distinguishable to an end-user.

Embedded threads are another authentication tool, which can take many forms, but their incorporation into a secured document product generally takes place during the manufacturing process of paper used for making high security documents. While such authentication tools enable central banks and BEMs' (Banknote Equipment Manufacturers) machines to easily authenticate banknotes, such devices being often hidden from the public, do not actively engage the public. Counterfeiters rely on this passive interaction between the public and the embedded threads to get by the public end-users who function as level-1 authenticators of such documents.

Windowed threads introduce a partial solution to the problem presented by embedded threads but can create additional issues which can be exploited by counterfeiters. For example, windowed threads can be woven into banknotes during the manufacturing process of the paper used to produce the banknote. In a final form, the thread is exposed in areas referred to as windows and is buried beneath the paper in areas referred to as bridges. While these windowed areas allow the public end-user to engage with the security feature, it also increases the likelihood of very authentic-looking counterfeits. This is because counterfeiters can simply remove the areas of the threads beneath the bridges and incorporate them into windowed areas of a counterfeit banknote; thereby creating what would appear to be an authentic banknote.

As is evident from the above, it can be seen that securing secured products continues to present myriad technical challenges. Heretofore, it has remained challenging to add security features to the surface of a high security document, and in particular to banknotes, as such authentication tools, whether in the form of stripes or patches, often adds variations in bill thickness (sometimes referred to as a caliper differential) which can be intolerable for downstream processes such as BEMS machines and shortens the lifecycle of the banknote during circulation. As discussed herein, articles of manufacture, methods, uses and products-by-process according to the present disclosure have proven to be surprisingly effective in incorporating a security device onto the surface of secured products, such as high security documents, without all the accompanying drawbacks discussed above.

The invention is as set forth in the claims presented herein. However, for purposes of clarity, such that a person having ordinary skill in the art (i.e., PHOSITA) may be able to make and use the claimed invention without undue experimentation, the following descriptions and drawings are provided as exemplary embodiments of the claimed invention. It should be understood that elements or components of each individual embodiment presented herein may be applied to another individual embodiment presented herein and thereby forming a further embodiment.

SUMMARY

In view of the above-identified deficiencies, certain embodiments according to this disclosure comprise (i) a security device; (ii) a method of forming a security device and (iii) a security device formed by this method; (iv) a secured product; (v) a method of forming the secured product and (vi) a secured product formed by this method; and (vii) use of the security device to secure a secure document, all without at least some of the above-identified deficiencies. The inventors have surprisingly found the present invention meets this objective.

According to various embodiments of this disclosure, a security device comprises a security film having (i) an array of image elements, (ii) an array of focusing elements, and (iii) at least one anti-viscid agent; wherein the array of focusing elements and the array of image elements are disposed relative to each other such that a synthetic image is projected by the security film when at least a portion of the array of image elements are viewed through at least a portion of the array of focusing elements; and wherein the anti-viscid agent is coupled with the array of focusing elements.

According to some embodiments of this disclosure, a method of forming a security device comprises providing a security film by (i) layering an array of focusing elements over an array of image elements such that a synthetic image is projected by the security film when the array of image elements are viewed through the array of focusing elements and (ii) coupling an anti-viscid agent to the focusing elements.

In a further aspect, the invention is a security device formed by the method described in the immediately preceding paragraph. In some embodiments according to this disclosure, a security device comprises a security film having (i) an array of image elements, (ii) an array of focusing elements, and (iii) at least one anti-viscid agent; wherein the array of focusing elements and the array of image elements are disposed relative to each other such that a synthetic image is projected by the security film when at least a portion of the array of image elements are viewed through at least a portion of the array of focusing elements; and wherein the anti-viscid agent is coupled with the array of focusing elements—wherein the security device is formed by a method comprising providing a security film by (i) layering an array of focusing elements over an array of image elements such that a synthetic image is projected by the security film when the array of image elements are viewed through the array of focusing elements and (ii) coupling an anti-viscid agent to the focusing elements.

In various embodiments according to this disclosure, a secured product comprises a secured product substrate and a security film having an anti-viscid agent and coupled to the secured product substrate.

According to certain embodiments of this disclosure, a method comprises providing a security film; and coupling the security film to a secured product substrate.

In a further aspect, certain embodiments comprise secured products produced using the methods of various embodiments of this disclosure. In at least one embodiment, the secured product comprises a secured product substrate; and a security film having an anti-viscid agent and coupled to the secured product substrate—wherein the secured product is formed by a method comprising providing a security film; and coupling the security film to a secured product substrate.

Various embodiments according to this disclosure include the use of the security device constructed according to some embodiments to secure a secured document. In one particular related embodiment, the use comprises using the security device, described throughout herein, to secure a secured product.

The aspects and embodiments generally summarized above will be further developed in the subsequent paragraphs and drawings.

DEFINITIONS

As used herein, the term “anti-block” shall mean preventing a security film from sticking to itself when rolled-up due to its tackiness.

As used herein, the term “or” shall be understood as including “or”, “and” or “and/or” unless the context requires otherwise.

As used herein, the term “coupled” shall be understood as including two components being directly or indirectly attached to each other.

As used herein, the term “F#” or “F-number” shall mean the ratio of a focusing element’s focal length to its effective diameter.

As used herein, the term “over” shall mean that in a final product the product can be physically oriented in at least one direction where the array of focusing elements is on top and the array of image elements are beneath the array of focusing elements.

DETAILED DESCRIPTION

Figure 1:
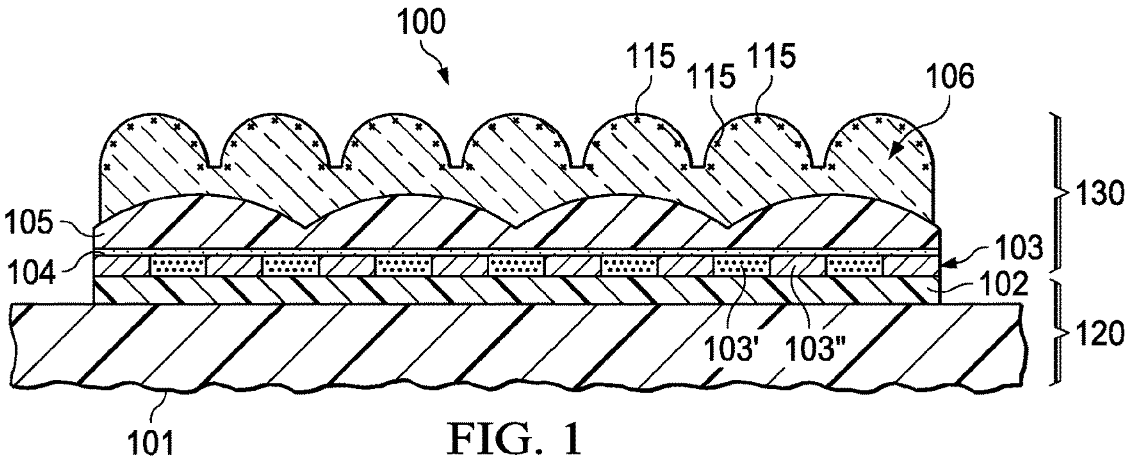
FIG. 1 illustrates a cross-section of an intermediate security device produced according to certain embodiments of this disclosure wherein a security film is layered over a carrier film.

It has been found that by using a carrier film and/or a transfer film to apply the security film to a secured product, a very thin security film can be used to secure the authenticity or aesthetics of the secured product.

Additional benefits will be apparent to a PHOSITA when considered in view of the present disclosure.

The security device according to some embodiments of the present disclosure comprise a security film which has (i) an array of image elements; (ii) an array of focusing elements; and (iii) at least one anti-viscid agent. This security film is also referred to herein under certain embodiments as film F9.

In view of the present disclosure (i.e., claims, drawings and description), a PHOSITA will understand that various embodiments, other than those explicitly recited herein, are possible and will be able to readily contemplate various other embodiments within the scope of the present disclosure.

For example, it is contemplated that, in various embodiments, additional components are added to the array of image elements, the array of focusing elements and the anti-viscid agent. In certain embodiments, for example, the security device includes, as part of the security film, one or more of the following additional components: an optical spacer; an embedding material; a primer layer; a contrasting material; a machine readable component; or a back coating. Similarly, the components (e.g., array of image elements and array of focusing elements) of the security film may be modified to change their optical response/projections by changing any one or set of the components' colors, shapes, sizes, dimensions or chemical makeup. Moreover, it is contemplated that in some embodiments according to this disclosure, the security device includes other components, in addition to the security film. For example, in certain embodiments, the security device includes at least one of a carrier film, a transfer film, or an adhesive element.

Image elements, as used herein, refer to the relief structures that are arranged in arrays to form images (e.g., full images, image portions or frames). The relief structures are distributed in a pattern across the array such that when viewed through the array of focusing elements the focusing elements and the image elements cooperate to project a synthetic image. Suitable image elements and methods of providing them are described in International Patent Application Publications WO2005/052650, WO2006/125224, WO2008/008635, WO2011/019912, WO2011/163298, WO/2013/028534, WO2014/143980, WO2009/017824, WO2016/044372, WO2016/011249, WO2013/163287, WO2007/133613, WO2012/103441, WO2015/148878, WO2005/106601, and WO2006/087138 which are all incorporated herein in their entirety.

The relief structures according to some embodiments comprise voids (e.g., through-holes and recesses) and neighboring or adjacent solid regions (e.g., protrusions) where the synthetic image is projected from the voids, the protrusions, portions of the voids, portions of the protrusions, or any combination thereof. These relief structures may be formed on or in an array layer. For example, the protrusions may be printed (e.g., by ink jet, laser jet, letterpress, flexo, gravure or even intaglio printing) onto the layer thereby forming print protrusions with adjacent print voids or may be embossed into the layer thereby forming embossed protrusions with adjacent embossed voids. Furthermore, the printed protrusions may be embedded thereby forming an array of embedded relief structures. An array of image elements may comprise any combination of these printed image elements, embossed image elements or embedded image elements. Various sizes are suitable for the image elements and it is also contemplated within the scope of the invention that an array of image elements may all have the same dimensions or that the sizes may vary. In some embodiments however, the image elements are micro-structured, meaning that some, or a substantial amount or all of the image elements are micron-sized. For example, in certain embodiments, the relief structures relied on for projecting the synthetic image (i.e., voids and/or protrusions) have a depth ranging from about 0.25 μm to about 8 μm and have a width ranging from about 10 μm to about 40 μm. It is also suitable to select various materials for forming the array of image elements and suitable examples include substantially transparent, colored or colorless polymers such as acrylics, acrylated polyesters, acrylated urethanes, epoxies, polycarbonates, polypropylenes, and the like. Various means of providing the layer will be apparent to a PHOSITA in view of this disclosure, however, exemplary methods include extrusion, radiation cured casting, injection molding, reaction injection molding or reaction casting. Preferably, the elected material has a refractive index greater than 1.2; more preferably ranging from 1.5 to 1.9.

The synthetic images projected by the security film through the cooperation of the image elements and the focusing elements rely on the contrast between the voids and protrusions to be discerned. This contrast can be provided by the dimensional and geometrical differences between the voids and protrusion, or by a contrast treatment applied to the voids and/or protrusions. Contrast treatment comprises applying a contrasting material to the security film such that it imparts a contrast between the voids and the protrusions or respective parts thereof. This contrast treatment can be provided in numerous ways including using different materials for forming the voids, the solid regions or respective portions thereof or by coupling a contrasting material to the voids, the protrusions or respective portions thereof. Coupling of the contrasting material includes filling or coating the voids or portions thereof, coating the protrusions or portions thereof, coating the backside of the voids or portions thereof, coating the backside of the protrusions or portions thereof, or any combination thereof. As used herein, the verb "coating" can encompass both back and front coating the voids, protrusions or portions thereof. Various contrasting materials for filling or coating will be apparent to a PHOSITA in view of the present disclosure. However, it is preferred that for filling or coating the contrasting material is an evaporated metal material having a different refractive index, or dyed or pigmented material. Where the image elements are embedded, the embedded protrusions can be formed by silver particles in gelatin, as a photographic emulsion, pigmented or dyed ink absorbed into an ink receptor coating, dye sublimation transfer into a dye receptor coating, and photochromic or thermochromic images in an imaging film. Alternatively, where the relief structures are printed on the image element array layer, the printed protrusions dyed, pigmented or reflective material or can be clear polymeric material. In certain embodiments, the protrusions or portions thereof are dyed or pigmented materials, but it is also contemplated that the printed voids in some embodiments will be contrast treated as like the voids described above. It should be understood that filling of the voids refers to occupying the full depth of the void while coating refers to anything less than the full volume of the void. A coat can be a very thin layer that traces the shape of the void or protrusion or the back of the void or protrusion.

In at least one embodiments the contrast is provided by a layer of contrasting material disposed between the array of image elements and the array of focusing elements, or coupled to the array of focusing elements. In certain embodiments, the layer of contrasting material is discontinuous, as it fills/coats the voids but does not coat the solid regions or is removed from the solid regions. According to some embodiments, the contrasting material may be disposed such that it fills/coats at least a portion of the voids and coats at least a portion of the solid regions. Where the voids are filled or coated, and the solid regions are coated, the contrast can effectively be provided by the dimensional/geometrical differences between the voids and the solid regions.

Various contrasting materials are contemplated within the scope of the present disclosure and will be apparent to a PHOSITA in view of the description provided herein. For example, suitable contrasting materials include pigmented materials, materials that can be cured in situ to have an optical contrast, or a reflective material. In a preferred embodiment, the contrasting material is either a pigmented material, which can be used to coat/fill voids or used for printing protrusions and forming voids. Alternatively, the contrasting material is a reflective material such as aluminum, zinc, or copper.

In various embodiments, the security device includes an additional component in the form of an ink layer which fills/coats the microstructures (e.g., voids or solid regions) formed within a layer of the security film. In some embodiments, the security device includes an additional component in the form of an aluminum back-coating which coats the back of the recesses. In certain embodiments, the additional component is a contrasting material in the form of an aluminum back-coating which coats the back of the solid regions. In an alternative embodiment, the additional component is a contrasting material in the form of printed pigmented or reflective material onto a layer of the security film. Various combinations of these embodiments are also contemplated; including back-coating portions of the image elements and filling or front coating other portions.

The image elements are, in various embodiments, organized in an array. The image elements—whether full images, image portions or frames—expand in a repeating pattern in multiple dimensions of the array such that a repeat period and pitch are provided. In view of the present disclosure, various means of forming the array of image elements will be apparent to a PHOSITA.

An array of focusing elements is coupled to the array of image elements such that a synthetic image is projected by the security film when the image elements or portions thereof are viewed through the array of focusing elements or portions thereof. Suitable focusing elements and methods of providing them are described in International Patent Application Publications WO2005/052650, WO2006/125224, WO2008/008635, WO2011/019912, WO2011/163298, WO/2013/028534, WO2014/143980, WO2009/017824, WO2016/044372, WO2016/011249, WO2013/163287, WO2007/133613, WO2012/103441, WO2015/148878, WO2017/105504, WO2005/106601 WO2006/087138 which are all incorporated herein in their entirety.

Various focusing elements are contemplated as being within the scope of the present disclosure. For example, refractive, reflective (e.g., concave reflective, convex reflective), hybrid reflective/refractive, and diffractive focusing elements are suitable. Moreover, the focusing elements may be selected from cylindrical or non-cylindrical lenses; focusing reflectors; opaque layers containing a plurality of apertures; or reflective layers. Furthermore, these non-cylindrical lenses generally comprise a lens body and a lens base. Lens bodies and bases for non-cylindrical lenses may be selected from any of spherical aspheric (e.g., conical, elliptical, parabolic, and the like) or combinations thereof. The base of these lenses may be selected from various geometries, though circular, oval, polygonal are preferred. These focusing elements are arranged in an array in regular, patterned or random, one- or two-dimensional arrays. The focusing elements may be arranged in subsets of focusing elements such that each sub-set is arranged in a polygonal shape such as a hexagonal shape pattern. In various embodiments, where the focusing elements are arranged in a polygonal shape, each side of the polygon includes at least two focusing elements. Moreover, it is contemplated herein that the focusing elements may constitute various colors, shapes, sizes, dimensions or chemical makeup. While it is preferred that the focusing elements have a uniform shape and size across the array of focusing elements, it is also contemplated that in certain embodiments the colors, shapes, sizes, dimensions or chemical makeup will vary across the array.

Security devices according to certain embodiments of this disclosure include an array of focusing elements that are embedded. It has been found that by embedding the focusing elements, the general soiling that is associated with focusing elements can be mitigated. Suitable embedding formulations and means of embedding the focusing elements are provide in U.S. Pat. No. 8,867,134, which is incorporated herein in its entirety. In certain embodiments, the embedding material has a refractive index that is less than the refractive index of focusing elements.

While the above options and various others that will be apparent to a PHOSITA in view of the present disclosure are suitable, in some embodiments, the focusing elements are non-cylindrical micro-sized lenses in a 2-dimensional array formed in a polymeric film layer. These lenses have an aspherical body and a polygonal (for example, hexagonal) base geometry. Sub-sets of the focusing elements are arranged in a hexagonal pattern as the pattern is expanded across the array. The ratio of the repeat period of the image elements to the repeat period of the focusing elements in at least one direction is substantially equal to 1 and the axis of symmetry of the array of image elements and the corresponding axis of symmetry of the array of focusing elements are rotationally misaligned providing orthoparallactic motion effects for the at least one synthetically magnified image. In various embodiments, such a security device has a thickness of less than 50 μm, more preferably less than 40 μm.

The lenses are characterized by an F#, which may be adjusted as desired to modify the synthetic image and its optical effect. Suitable F numbers, in view of the desired thickness of the security film or security device, are preferably adjusted to be less than 10; more preferably less than about 4; and in some embodiments, most preferably less than 2 or 1. The synthetic image is also modulated by the relative arrangements and alignments of the array of focusing elements to the array of image elements and each array has respective repeat periods. The repeat periods of the respective arrays may be adjusted such that their ratios are equal to 1, slightly above or slightly below 1; though ratios substantially above and substantially below 1 are also contemplated. Base diameters (equivalent to base widths for cylindrical lenses) of the focusing elements may also be adjusted as desired and it is within the scope of the present disclosure that these base diameters could have ranges of 200 μm to 500 μm; 50 μm to 200 μm; less than 50 μm (more preferably less than about 45 μm or ranging from about 10 μm to about 40 μm). The focusing elements may further be modified by adjusting the focal lengths such that the focal lengths allow for image elements in the array of image elements to be viewed through the focusing element and project a synthetic image. Focal lengths of less than 50 μm are suitable; more preferably less than 45 μm; and, in various embodiments, most preferably ranging from about 10 μm to about 30 μm.

While materials of various refractive indices may be employed for forming the array of focusing elements, it has been found most suitable to use those materials having a refractive index ranging from about 1.0 to about 2.5. High refractive index, colored or colorless materials having refractive indices (at 589 nm, 20° C.) of more than 1.5, 1.6, 1.7, or higher, such as those described in U.S. Patent Application Publication No. US 2010/0109317 A1 to Hoffmuller et al., may also be used in the practice of the present invention for providing a focusing element formulation or an image element formulation (i.e., used to form the layer of image elements). Grin lenses are also contemplated within the scope of the present invention.

Various components may be coupled to the array of focusing elements. Applicant has found that manufacturability is substantially improved by coupling an anti-viscid agent to the array of focusing element. It should be noted that, in certain embodiments, the coupling of the anti-viscid agent to the array of focusing elements must be done without interrupting the optical function of the array of focusing element, thereby maintaining the optical integrity needed to project a synthetic image. Suitable anti-viscid agents therefore should not substantially interfere with the F#, focal length, color, or refractive index of the array of focusing elements. Moreover, some suitable anti-viscid agents provide the focusing element formulation with a targeted adhesive balance (TAB) such that during manufacturing, the adhesion between the security film and the transfer film is strong enough to avoid delamination during transport phase, but weak enough to allow easy separation of the array of focusing elements from the transfer film, during the transfer phase. Accordingly, in various embodiments, the anti-viscid agent modulates the adhesive strength of the interface between the security film and the transfer film.

While it is contemplated that, in various embodiments according to this disclosure, that the anti-viscid agent is coupled to the array of focusing elements by being integrated within the security film as a discrete layer separate from the array of focusing elements, it is also contemplated that the anti-viscid agent is disposed in the array of focusing elements in a discontinuous manner, such as where it is blended in as a dispersion or emulsion. In certain embodiments, the anti-viscid agent may be coupled to the array of focusing elements as a random or organized distribution of particles; or may be coupled as a layer within the thickness cross-section of the array of focusing elements. In certain embodiments, where the anti-viscid agent is disposed within the array of focusing elements as a distribution of particles, the particles are un-pigmented or have the same pigmentation of the focusing elements such that they are indistinguishable from the focusing elements. Coupling the anti-viscid agent to the array of focusing element may also comprise selecting the focusing element formulation and mixing/blending or otherwise combining an anti-viscid formulation into the focusing element forming a solution, admixture, dispersion, emulsion or the like.

In some embodiments, the anti-viscid agent is coupled to the array of focusing elements, it is also within the present invention's scope that the anti-viscid agent is coupled to the transfer formulation, the transfer formulation layer, the focusing element formulation, the focusing element formulation layer (the array of focusing elements) or any combination thereof.

In one embodiment, the anti-viscid agent is a surfactant; such as a non-ionic surfactant, or non-ionic emulsifiers. Suitable non-ionic surfactants will be apparent to a PHOSITA. However, it has been found effective to use surfactants having at least one ester functional group and hydrocarbons. According to at least one embodiment, the surfactant includes multiple or alternating groups of esters and hydrocarbons.

Alternative surfactants include those possessing alternating ethylene oxide and alkylene oxide units. For example, surfactants such having the EO-AO-EO-AO repeating pattern are suitable. Each EO or AO group represents approximately between 1-10 ethylene oxide or alkylene oxide groups, respectively. Examples of these are surfactants of the general formula:

$$R^1—O—(CH_2—CH_2—O)_W—(CH_2—\underset{\displaystyle R^2}{\underset{|}{CH}}—O)_X—(CH_2—CH_2—O)_Y—(CH_2—\underset{\displaystyle R^3}{\underset{|}{CH}}—O)_Z—H$$

where $R^1$ stands for a linear or branched, saturated or mono- or polyunsaturated $C_{6-24}$-alkyl or alkenyl group, each group $R^2$ or $R^3$ independently of one another is selected from $—CH_3$, $CH_2CH_3$, $—CH_2CH_2—CH_3$, $—CH(CH_3)_2$, and the indices w, x, y, z independently of one another stand for whole numbers from 1 to 6. They can be manufactured by known methods from the corresponding alcohols $R^1—OH$ and ethylene- or alkylene oxides.

U.S. Pat. No. 6,677,293 also discloses non-ionic block co-polymers that are suitable surfactants and is incorporated by reference herein in its entirety.

The security film projects a synthetic image which is to be understood as an image composed through the cooperation of the array of image elements and the array of focusing elements. This cooperation can be in several forms. However, in preferred forms, a viewer observing the image elements or portions thereof through the focusing elements will see a magnified version of those image elements or portions thereof and the observer's eyes stereoscopically combine the various magnified image elements or portions thereof to provide an image (i.e., the synthetic image) or a plurality of synthetic images composed of the magnified portions of the image element. These synthetic images may display various optical effects, including Deep, SuperDeep, Float, or SuperFloat and various parallax motion when a viewer's point of view, relative to the security film or security device, is changed. It is also contemplated that various other optical effects are possible and such effects will be apparent to a PHOSITA in view of the present disclosure. As it relates to the synthetic image, it is to be understood that a synthetic image as used herein refers to an image formed through the magnification and composition of image points present beneath the focusing elements in the array of image elements. The image points can be full images, image-portions or frames. As used herein, frames refer to image points (pixels) consisting of images of different angles of the same image, such as where the images are organized in a dual-axis interlacing of an image viewed from varying axes along an x- and y-axis. Frames and dual-axis interlaced image elements are described in U.S. Pat. No. 9,019,613 which is incorporated herein in its entirety. Suitable synthetic images are described in U.S. Pat. Nos. (i) 9,482,792, (ii) 8,739,711, (iii) 7,333,268, (iv) 8,310,760, (v) 7,468,842, (vi) 7,738,175, (vii) 8,773,763, and (viii) 8,867,134 which are all incorporated herein in their entirety.

As noted, it is contemplated within the scope of the present invention that various other components may be added to the security film or the security device. For example, the synthetic image and its image quality will partly depend on whether the distance from the focusing element to the image elements is coextensive with the focal length of the focusing elements. This distance can be adjusted by the presence or absence of an optical spacer. The optical spacer is disposed between the focusing elements and the image elements. For example, the focusing elements and the image elements may be arranged in an array on respective opposing sides of the optical spacer or the spacer may be disposed as a distinct layer between the array of focusing elements and the array of image elements. Suitable spacers are described in International Patent Application Publication WO2005/052650 which is incorporated herein in its entirety. The optical spacer is preferably formed using one or more essentially colorless or transparent materials including, but not limited to, polymers such as polycarbonate, polyester, polyethylene, polyethylene napthalate, polyethylene terephthalate, polypropylene, polyvinylidene chloride, and the like. Means of coupling the optical spacer to the other components (e.g., array of focusing elements, array of image elements) will be apparent to a PHOSITA in view of the present disclosure, including layering the components, present in an emulsion or dispersion form, and then curing these layers in situ.

Optical spacers may take many shapes including flat, sinusoidal, or other structural relief. In a preferred embodiment, the optical spacer includes a structural relief on at least one of its sides. More preferably, the optical spacer has a relief structure, disposed proximate the focusing elements, formed by an embossing tool used for forming lenses or focusing elements in a polymeric material. In such instances, the relief structures are preferably an array of lenses (spacer-lenses), having at least one repeat period and extending across multiple axes. The ratio of the repeat period of the spacer-lenses to the repeat period of the focusing elements is preferably slightly less than 1 or slightly greater than 1. However, in alternative embodiments, the repeat periods are the same or are substantially greater than 1 or less than 1. It is also contemplated that the optical spacer has a width that is equivalent or less than the width of the array of image elements.

In one specific embodiment, the array of focusing elements has a first repeat period and the spacer's relief structure has a second repeat period and the first repeat period is larger than the second repeat period. It is therefore within the scope of the present invention that the spacer-lenses and the focusing elements have different sizes. It should also be apparent that the spacer-lenses and the focusing elements include, but are not restricted to, embodiments that have the same size, shape, materials, repeat period, or refractive index. However, in a preferred embodiment, the refractive index of the spacer is identical or substantially identical to that of the array of focusing elements.

In certain embodiments, the security device, in addition to the security film, further comprises at least one of a carrier film, a transfer film, and secured product substrate. When the carrier film is present it is coupled to the security film on the side proximate the array of image elements and when the transfer film is present it is coupled to the security film on the side opposite the array of image elements; and when the secured product substrate is present, it is coupled to the security film on the side proximate the array of image elements and the carrier film is absent.

Another aspect of the present invention is a method of producing the security device and a method of producing a secured product. This method comprises, in general, a first transport (TPP1) phase, a first transfer phase (TFP1), a second transport phase (TPP2), a second transfer phase (TFP2) and a third transport phase (TPP3). The first transport phase comprises the use of an intermediate film F1 (e.g., carrier film) to transport the security film as it is coupled to the carrier film. In the subsequent first transfer phase, the security film, coupled to the carrier film, is further coupled to the transfer film which initiates the first transfer phase where a security device comprising a carrier film, a security film and a transfer film is separated at or along the interface between the carrier film and the security film. In the second transport phase, a security device is provided where the security film is coupled to the transfer film and is transported thereby. In a second transfer phase, the security film is then coupled to the substrate of the secured product forming another intermediate security device comprising a security film disposed between a transfer film and a substrate of a secured product—this security device is separated at or along the interface between the security film and the transfer film during TFP2. In the third transport phase, the security film is coupled to the substrate of the secured product.

In forming the security device, the carrier film is used as a base substrate for forming and/or transporting the security film. This can best be illustrated by intermediate film (100) presented in FIG. 1. The carrier film (120) comprises a base film bf1 (101) and optionally at least one of a sub-coat layer (102) and an anti-block element (not shown). Suitable materials for bf1 (101) will be apparent to a PHOSITA in view of the present disclosure. However, in a preferred embodiment, bf1 (101) is selected from a polyethylene terephthalate (PET), polyethylene napthalate (PEN), polypropylene, polyvinylidene chloride films or sheets, Mylar sheets, cellophate, paper, rag/cotton or any combination thereof.

In one particular embodiment, the first transport phase comprises using the carrier film (120) to transport the security film (130). Here, base film bf1 (101) of the carrier film (120) has a first side and a second side. A first sub-coat layer (102) is coupled to the first side. On the opposing second side is optionally present at least one of a second sub-coat layer and an anti-block element (coupled to a side of the second sub-coat layer, opposite the bf1). The layers of the security film (130) are then built upon the first sub-coat layer (102). As such, the security film can either be built on layer-by-layer or can be affixed as a pre-fabricated multi-layered structure. In one embodiment, the security film is built on layer-by-layer where the first security film (130) layer is the array of image elements (103 (incl. 103' & 103")), followed optionally by a layer of contrasting material (104), followed optionally by an optical spacer (105), followed by an array of focusing elements (106) either pre-treated (as described above) or in situ treated (by spraying or vacuum deposition) with an anti-viscid agent (115), thereby providing intermediate film F6.

Figure 2:
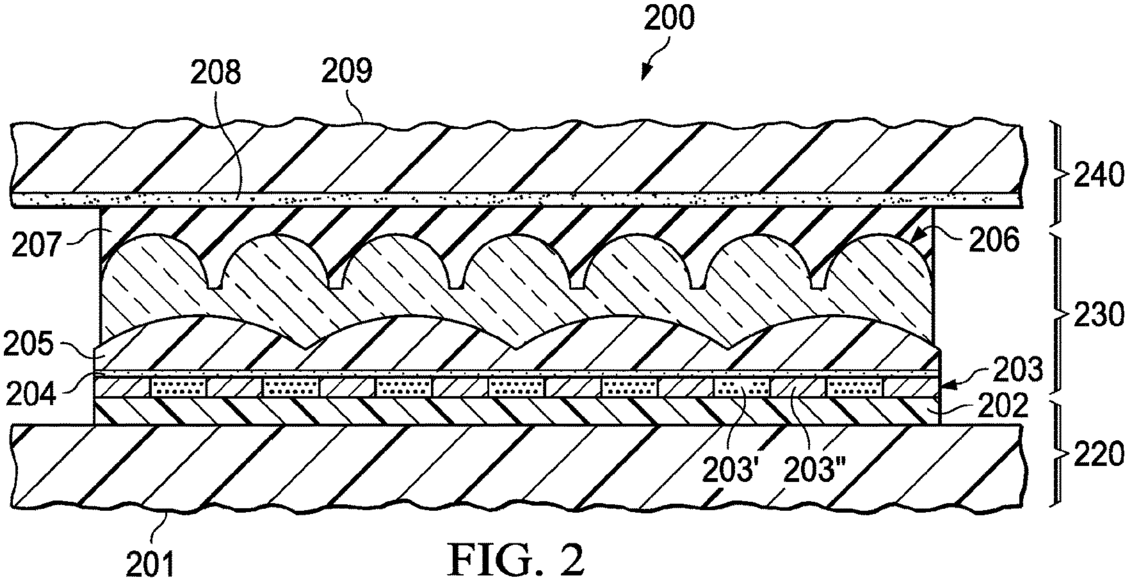
FIG. 2 illustrates a cross-section of an intermediate security device according to various embodiments of this disclosure where a security film is disposed between a carrier film and a transfer film.
Figure 3:
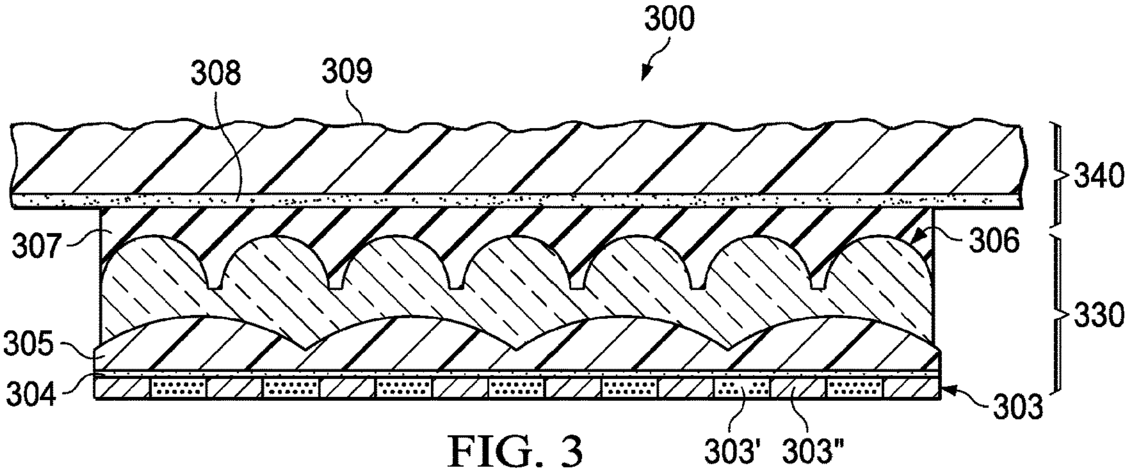
FIG. 3 illustrates a cross-section of an intermediate security device according to some embodiments of this disclosure where a security film is coupled to a transfer film.
Figure 4:
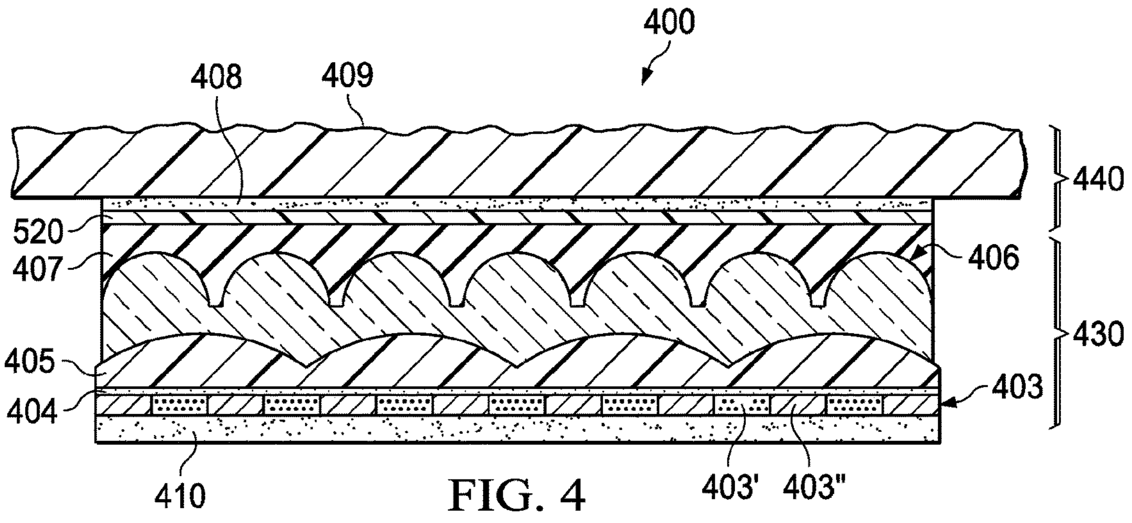
FIG. 4 illustrates a cross-section of an intermediate security device according to certain embodiments of this disclosure where a security device (for example, the security device of FIG. 3) further includes an adhesive element and a primer layer.

In one particular embodiment of the first transfer phase, depicted in FIG. 2, film F6 (100), having a carrier film (220) coupled to a security film (230) is fed through a press and thereby coupled to a transfer film (F6') (240). Here, the base film (bf2) (209) of the transfer film (240) has a first side and a second side. A first sub-coat layer (208) is coupled to the first side of bf2 (209). On the opposing second side is at least one of a second sub-coat layer (not shown) and an anti-block element (coupled to a side of the second sub-coat layer, opposite the bf2). Suitable anti-block materials will be apparent to a PHOSITA and include materials that prevent the security film (130, 230) from sticking to itself when rolled-up due to its tackiness. A transfer formulation layer (207) is disposed between the transfer film (240) and the security film (230). While it should be understood that the transfer formulation (207) may be added to the security film (230), or the transfer film (240), it may also be independently fed between both films (230, 240) while those films are being transported on the press. In certain embodiments a layer of image elements 203 is disposed on carrier film 220. According to various embodiments, layer of image elements 203 comprises image elements 203' and 203". As shown in the non-limiting example of FIG. 2, a layer of contrasting material 204 may be applied to layer of image elements 203. In certain embodiments, an optical spacer 205 may be provided above layer of image elements 203. In the first transfer phase the coupling of film F6 (100) (i.e., the carrier film plus security film) to the transfer film (F6') (240), is followed by removal of the carrier film (101, 201) from film F8 (200) to produce intermediate film F9 (300), as depicted in FIGS. 3 and 4, and having the security film (330) coupled to the transfer film (340) on the side proximate to the focusing elements (306) and distal from the image elements (303). According to various embodiments, layer of image elements 303 includes image elements 303' and 303". In various embodiments according to this disclosure, an optional primer layer (308) may also be disposed between a transfer formulation layer (307) and the base film (309). In some embodiments, an optical spacer 305 is disposed beneath focusing elements 306. As shown in the non-limiting example of FIG. 3, a layer of contrasting material 304 is provided underneath optical spacer 305.

Figure 5:
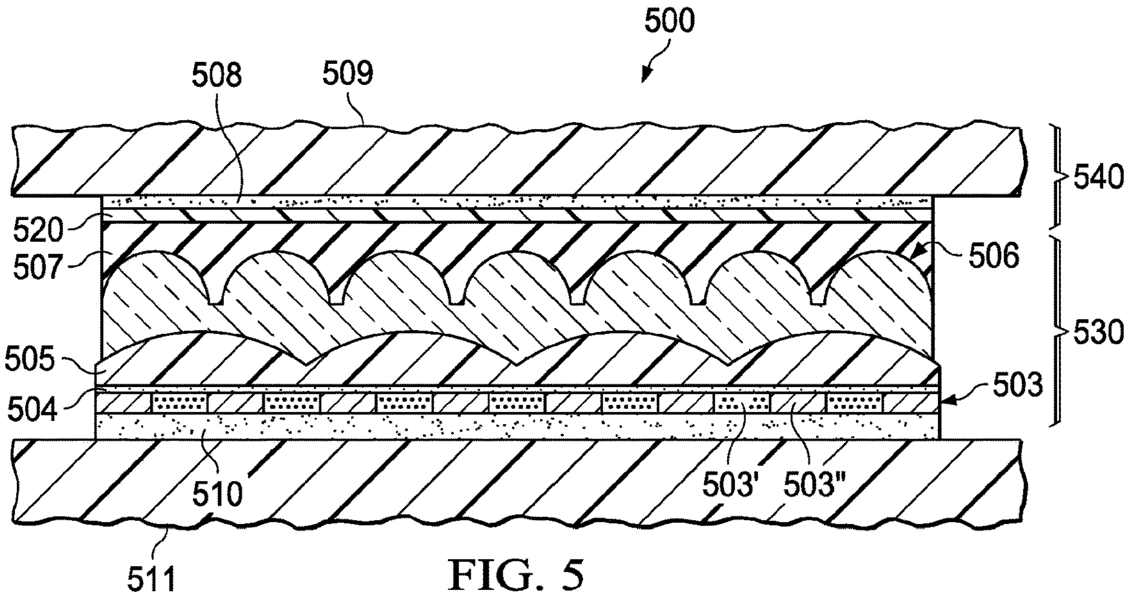
FIG. 5 illustrates a cross-section of an intermediate security device according to certain embodiments of this disclosure, where a security film is disposed between a transfer film and a secured substrate.
Figure 6:
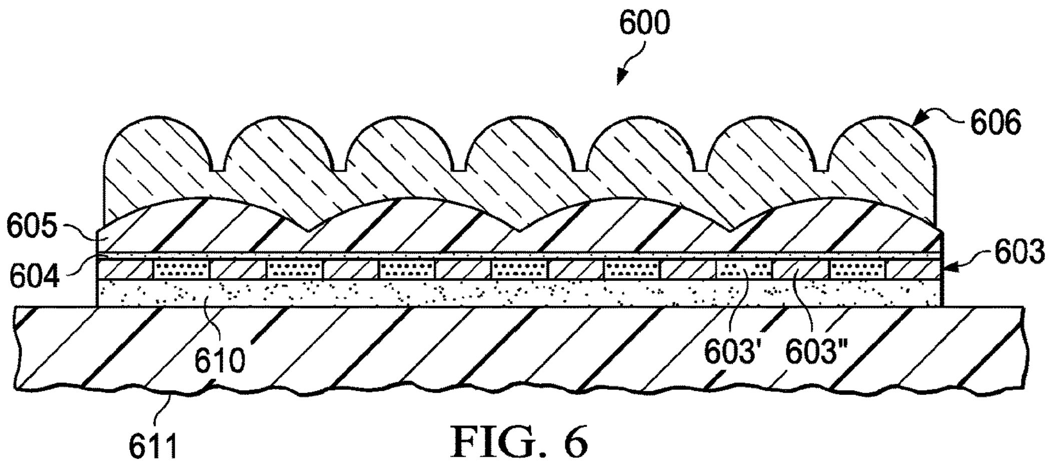
FIG. 6 illustrates a cross-section of an intermediate security device according to some embodiments of this disclosure, where a security film is secured to a secured substrate by means of an adhesive element.
Figure 7:
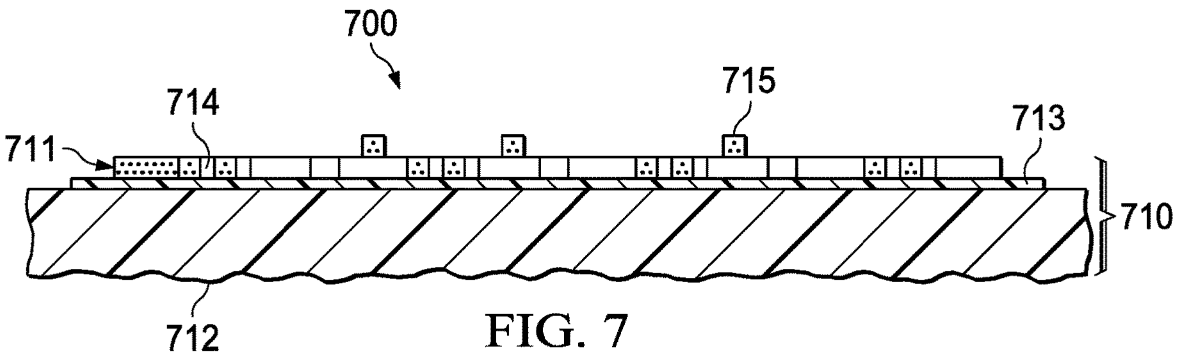
FIG. 7 illustrates a cross-section of an array of image elements according so some embodiments of this disclosure, wherein image elements are provided by micro-structure or by print to provide voids and protrusions on or in the array of image elements (e.g., image element layer).

In a second transport phase, depicted in FIGS. 4 and 5, film F9 (400) is coupled with an adhesive element (410, 510, 520) and thereby coupled to a substrate (511) of a secured product (not shown) where in a second transfer phase, the security film (530) is transferred to the secured product's substrate (511, 611) as depicted in FIG. 6. In the non-limiting example of FIG. 4, a security film 430 and a transfer film 440 are illustrated. According to various embodiments, layer of image elements 403 includes image elements 403' and 403". In various embodiments according to this disclosure, an optional primer layer (408) may also be disposed between a transfer formulation layer (407) and the base film (409). In some embodiments, an optical spacer 405 is disposed beneath focusing elements 406. As shown in the non-limiting example of FIG. 4, a layer of contrasting material 404 is provided underneath optical spacer 405. According to various embodiments, layer of image elements 503 includes image elements 503' and 503". In various embodiments according to this disclosure, an optional primer layer (508) may also be disposed between a transfer formulation layer (507) and the base film (509). In some embodiments, an optical spacer 505 is disposed beneath focusing elements 506. As shown in the non-limiting example of FIG. 5, a layer of contrasting material 504 is provided underneath optical spacer 505. According to various embodiments, layer of image elements 603 includes image elements 603' and 603". In some embodiments, an optical spacer 605 is disposed beneath focusing elements 606. As shown in the non-limiting example of FIG. 6, a layer of contrasting material 604 is provided underneath optical spacer 605. According to various embodiments, an adhesive element 610 is provided between layers 603 and 611.

Figure 8:
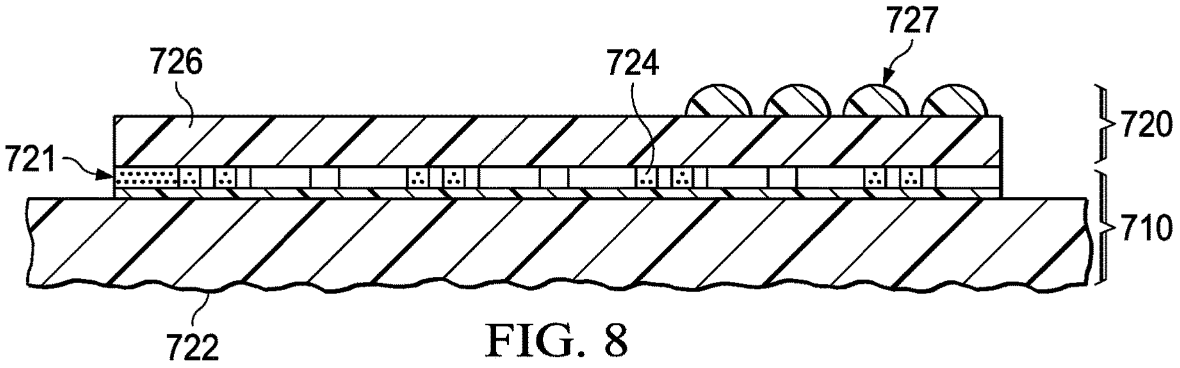
FIG. 8 illustrates a cross-section of an array of image elements according to embodiments of this disclosure, wherein the image elements are layered beneath an optical spacer that includes at relief structures distributed over at least portions of one side of the spacer.

Various means are contemplated for transporting and transferring the intermediate films (e.g., F1 to F11) (100, 200, 300, 400, 500, 600). However, in a preferred embodiment, the process is by a press operated on a continuous feed. In a further step during the first transport phase, a contrasting material layer (714'"), formed from a contrasting formulation, is coupled to the array of image elements (711). Various means are contemplated for providing the contrasting material layer (714'") including flood coating the array of image elements (711) with the contrasting formulation (714'") until the voids (714) are filled/coated and then optionally removing any excess to leave the solid regions (714") clear of contrasting material or no more than will distort the contrast between the voids and the solid regions. For example, in one embodiment, the contrasting material (714'") is flood-coated onto the array of image elements (711) filling the void (714') and all excess is removed from other areas (714"), leaving only the voids (714') layered with the contrasting material (714'"). The contrasting material (714'") may also be applied on an opposing side of the array of image elements (711) or may optionally or alternatively be applied as a print (715) where the protrusions are the contrasting material (715'). In a further step during the first transport phase, depicted in FIG. 8, an optical spacer layer (726) is coupled with intermediate film F4 (710) which includes the carrier film (712, 722), array of image elements (711, 721) and optionally the contrasting material (724). In one embodiment, the optical spacer (726) is formed by disposing a spacer formulation over film F4 (710). The spacer's (726) dimensions, particularly its height, can be adjusted as necessary to account for the focal length of the focusing elements. In a further step during the first transport phase, the array of focusing elements is coupled to film F5

Figure 9:
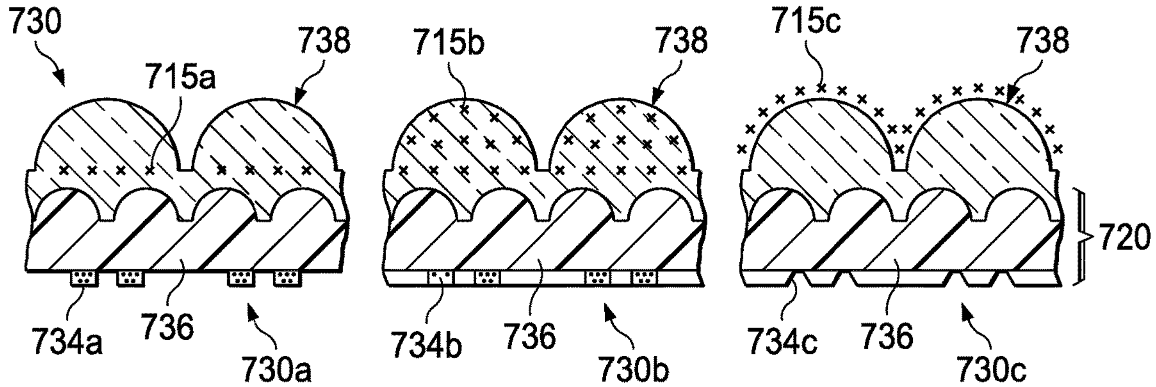
FIG. 9 illustrates, in a cross-section three examples according to the present disclosure, of incorporating an anti-viscid agent and image elements.

(720), as depicted in FIG. 9, by disposing a focusing element formulation (738) over the optical spacer (736). It is contemplated within the scope of the present invention that an embossing apparatus (not shown) is used to produce lenses (cylindrical or non-cylindrical) (738) in the focusing element formulation before, during or after the focusing element formulation (738) is uv-treated with UV5, thereby producing intermediate film F6 (including elements 730*a*, 730*b*, 730*c*, and in certain embodiments, spacer layer 730). FIG. 9 (730*a*) provides intermediate film F6 with an array of printed image elements (734*a*); FIG. 9 (730*b*) provides intermediate film F6 with an array of embedded image elements (734*b*); while FIG. 9 (730*c*) provides intermediate film F6 with an array of micro-structured (734*c*) image elements. Film F6 (730*a*, 730*b*, 730*c*) is a security device comprising a base film with a sub-coat, an image formulation layer (i.e., array of image elements) (734*a*, 734*b*, 734*c*), an ink layer (i.e., ink-filled voids), a spacer formulation layer (i.e., spacer layer) (736) and a focusing element formulation layer (i.e., array of focusing elements) (738) stacked together such that the spacer layer (736) is disposed between the array of focusing elements (738) and the array of image elements. In other words, intermediate film F6 comprises a carrier film (120) and a security film (e.g., as best depicted in FIG. 1). The focusing element formulation, as provided, is treated with an anti-viscid agent (715*a*, 715*b*, 715*c*). As depicted in FIG. 9, the anti-viscid agent may be applied to the focusing element in numerous ways including as a discrete layer (715*a*) within the focusing element; as a uniform or substantially uniform distribution (715*b*) within the focusing elements; or as a discrete layer (715*c*) disposed over the focusing elements. It should be understood that these each element depicted in these embodiments may be respectively interchanged.

In a further step during the first transfer phase, film F6 (100) (i.e., security film (230) and carrier film (220)) is fed through a continuous process such as an on-line continuous press where it is coupled with a transfer film F6' (240), as depicted in FIG. 2, to form security device or intermediate film F7 (200). Film F6' (240) is as described herein and in one embodiment is fed into the press such that the anti-block on the base film bf2 (209) is distal from the security film (230) and the sub-coat (208) on the first side of bf2 (209) is proximate to security film (230). Additional layers may be optionally coupled to the F6' film such as a primer layer. Moreover, a transfer formulation layer is disposed between the security film (230) and the transfer film (240). The transfer formulation layer (207) is formed from a transfer formulation disposed directly on the security film (230) or on the transfer film (240); preferably the security film (230). According to various embodiments, the transfer formulation fills the interstitial spaces around the focusing elements, allows the transfer film to remain laminated to the transfer layer during the second transfer phase, but also delaminate from the security film during the second transfer phase. This delamination is best demonstrated in FIG. 10, where the transfer formulation layer (817) of transfer film 810 forms a complementary geometry to the focusing elements (816) and the focusing elements (816) include an anti-viscid agent (815) disposed in a discrete layer (815) at the top of the focusing elements (816).

In a further step of the first transfer phase, the security film (230) is de-coupled from the carrier film (220) as force is applied to film F8 to force the delamination along the interface between the security film (230) and the carrier film (220), thereby providing a security device, intermediate film F9 (300), as depicted in FIG. 3. Film F9 (300) comprises (i) the transfer film (340) and (ii) the security film (330). A base film 300 may be provided in various embodiments of this disclosure.

Figure 11:
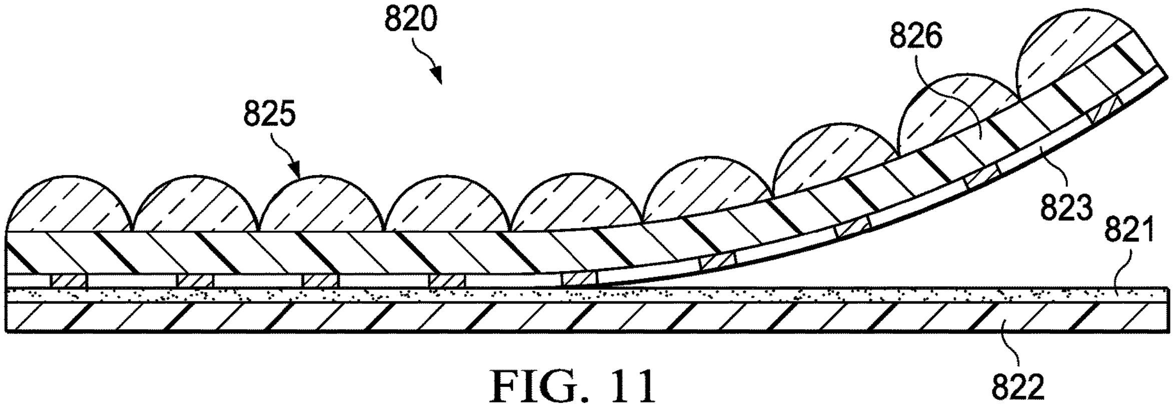
FIG. 11 illustrates a cross-section of a security device according to the various embodiments of this disclosure wherein a security film is applied to a secured substrate.

In a further step of the second transport phase, intermediate film F9 (400) is coupled with an adhesive element (410) suitable for coupling film F9 to a secured substrate or in the alternate, as depicted in FIG. 11, the adhesive element (821) is applied to the secured substrate (822). Referring to the non-limiting example of FIG. 11, an anti-viscid 825 is applied to the focusing elements of security film 820. According to various embodiments, a focusing layer 826 and layer of image elements 823 are provided as part of security film 820.

Figure 10:
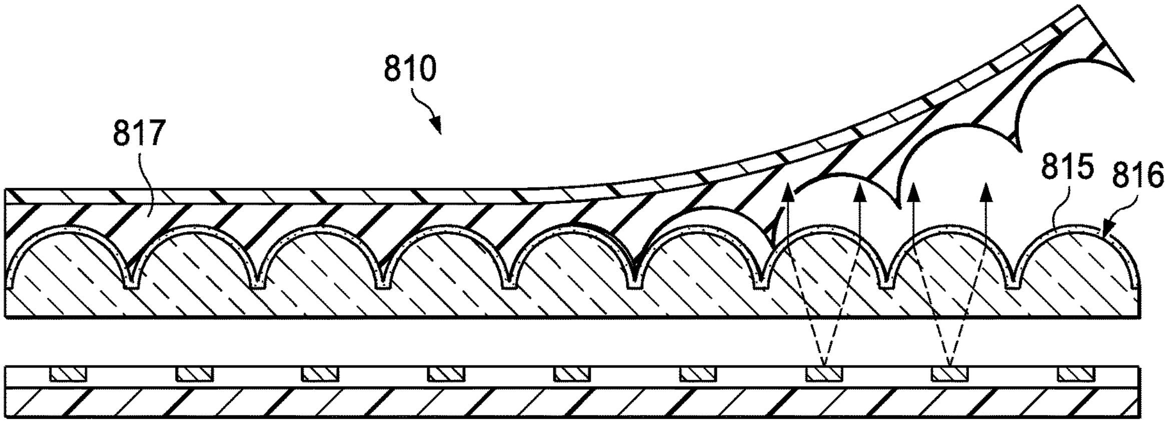
FIG. 10 illustrates a cross-section of a security device according to certain embodiments, which includes a discrete anti-viscid agent layer over the focusing elements and which is formed via a separation of the transfer film from the security film.

In the second transfer phase, best depicted by FIGS. 5 and 10, intermediate security device F10 (400) is coupled to a secured substrate (511) to form a secured product or intermediate film F10' (500). F10' is a secured product comprising a transfer film (540), a secured substrate (511) and a security film (530) coupled thereto by an adhesive element (510) disposed between the security film (530) and the secured substrate (511). The transfer film (540) is then removed from film F10' leaving film F11 which comprises a security film (530, 630) coupled to a secured substrate (611).

Base films bf1 and bf2 may be constructed of any material with suitable flexibility to allow flexing during the transfer phase. In certain embodiments, bf1 and bf2 may either be of the same material or of different materials. In one particular embodiment, bf1 is a 59 gauge PET film while bf2 is a 92 gauge PET film.

Figure 12:
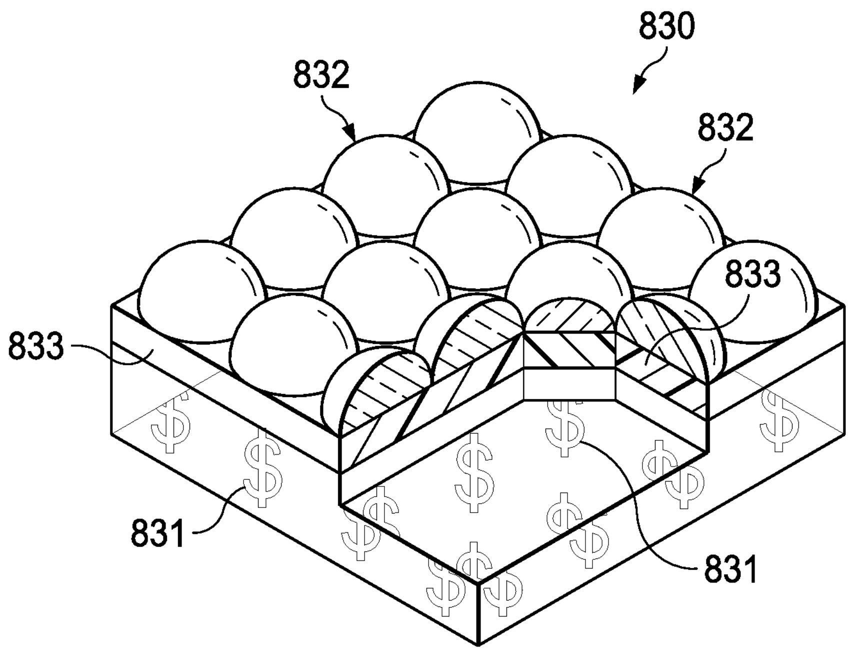
FIG. 12 is an isometric cutaway view of a security film according to certain embodiments of this disclosure, demonstrating the array of image elements, the spacer with relief structure and the array of focusing elements coupled together to produce a synthetic image.
Figure 13:
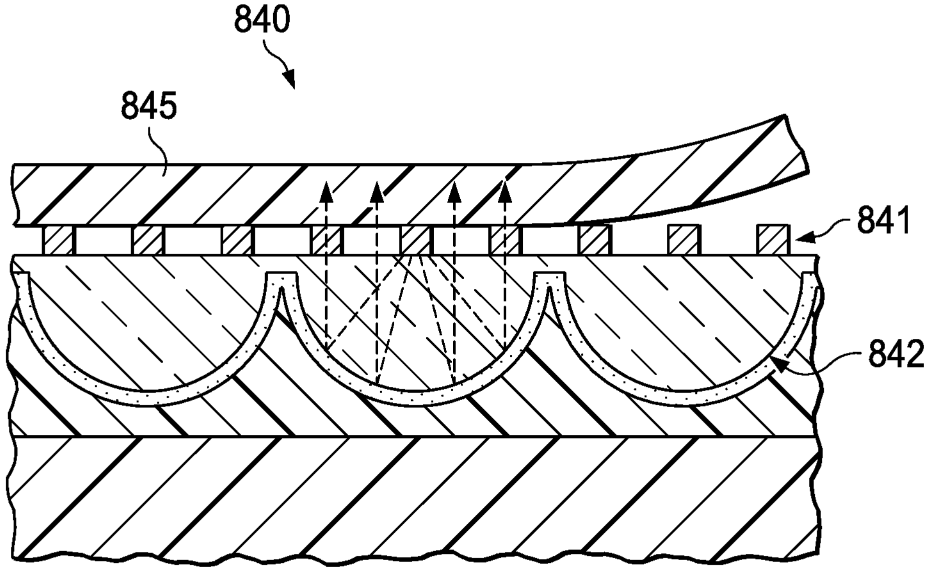
FIG. 13 is a cross-section of a security device according to at least one embodiment of this disclosure, in which the focusing elements are reflective and are disposed beneath an array of image elements and a transfer film, the transfer film being disposed over the image elements and used to transfer the security film to a secured substrate (not shown).

As noted herein, the resulting security film comprises an array of image elements, and an array of focusing elements coupled together to project a synthetic image. FIGS. 12 and 13 provide exemplary embodiments of the resulting security film (830, 840). For example, in FIG. 12, the image elements (831) are depicted as "$" and the focusing elements (832) are a set of refractive micro-lenses (832) arranged in an array expanding across a multiplicity of axes. Moreover, the security device also includes and optical spacer (833) with a relief structure (833'). Alternatively, in FIG. 13, the focusing elements (842) are reflective and are disposed beneath an array of image elements (841) and a transfer film (845) disposed over the image elements and used to transfer the security film to a secured substrate (not shown).

In another aspect of the present invention, a product-by-process is provided whereby the security device, as described herein, is made by the process as described herein.

In another aspect of the present invention a use is provided. In one embodiment, the use comprises using the security device to secure a high value or high security product by coupling the security device to a substrate of the high value or high security product.

Various secured products are contemplated within the scope of the present invention. Secured products comprise a security device coupled to a substrate layer. While various secured products will be apparent to a PHOSITA, in one particular embodiment, the secured product is a high security product such as a banknote, check, money order or other monetary instrument. Where the secured product is a banknote, it is within the scope of the present invention that the security device is in the form of a patch or a stripe of various shapes, sizes and colors. Moreover, it is preferred that the security device is coupled to the secured product substrate's surface instead of being embedded beneath the surface of the banknote paper, though this is not exclusive. In an alternative embodiment, the security device is coupled to the surface with at least one of its edge at least partially buried beneath or within a depth of the banknote paper. Suitable means for transferring the security film from a transfer film to a substrate will be apparent to a PHOSITA, including by means of hot-stamp foiling.

In a first example embodiment, a carrier film is produced by providing an intermediate film F1 comprising a base film (BF1) and a sub-coat. A security film is then formed on the carrier film (F2). To form the security film an image formulation is deposited onto the sub-coat of carrier film F2 where it is uv-treated with uv-radiation (UV2) and embossed with an icon embossing apparatus to create micro-structures in the image formulation and thereby forming intermediate film F3. Film F3 has a UV2-cured image formulation layer and micro-structures formed in the icon formulation layer by the icon embossing apparatus. The micro-structures of F3 are then flood-coated with ink-1, followed by removal of excess from the solid regions. Ink-1 is then uv-treated with uv-radiation (UV3), thereby producing intermediate film F4. A spacer layer is then formed on intermediate film F4. To form the spacer layer, a spacer formulation is deposited over the image formulation layer side of F4. A layer or array of focusing elements is then formed over the spacer layer by first depositing a focusing element formulation on the spacer layer. A lens tool is used to produce micro-structured lenses in the focusing element formulation. Film F6 is then uv-treated again using uv-radiation (UV6). Film F6 comprises a base film with a sub-coat, an image formulation layer (i.e., array of image elements), an ink layer (i.e., ink-filled voids), a spacer formulation layer (i.e., spacer layer) and a focusing element formulation layer (i.e., array of focusing elements) stacked together such that the spacer layer is disposed between the array of focusing elements and the array of image elements. In other words, intermediate film F6 comprises a carrier film and a security film.

Film F6 is fed through a press where it is attached to a transfer film thereby forming film F7. The transfer film (film F6') is provided where it comprises a base film BF2, an adhesion promoting sub-coat on a first side thereof, and a sub-coat and an anti-block layer on the opposing side thereof. A primer layer is coupled to the first side of film F6' to form film F6". A transfer formulation is coupled to the array of focusing elements to form film F7. An anti-viscid agent is, in certain embodiments, applied to the array of focusing elements. Film F6" and film F7 are coupled such that the primer layer is in contact with the transfer formulation layer thereby forming film F8.

Film F8 is modified by removing the carrier film, leaving behind film F9. Film F9 comprising (i) the transfer film having, (ii) the primer layer, (iii) the transfer formulation layer, and (iii) the security film.

Adhesive was added to film F9 on the icon side thereby producing the security device (film F10).

Film F10 is cut into stripes and the transfer film is removed to produce the security film (film F11). Removal of the transfer film coincides with coupling of the security film with a secured product substrate.

Film F10 can also be cut into patches by turning F10 upside down so that the adhesive element is on top and BF2 is on the bottom. The patches are cut and the carrier layer is removed to produce film F11 in patch form.

In a second example embodiment, a security film comprising (i) a carrier film and (ii) a security film disposed over the carrier film. The security film includes a 92 gauge base film bf1 and a sub-coat disposed between array of image elements and the bf1 film. The security film comprises an array of focusing elements disposed over an array of image elements, wherein the array of image elements and array of focusing elements are disposed on opposing sides of an optical spacer. Here the array of image elements are formed as micro-structure voids that are filled with an ink having sub-micron pigments. The layers of the security film (image, spacer and focusing) are layered in the order they appear in the parentheses over a side of the security film having a sub-coat. The carrier film's sub-coat is in direct contact with the array of image elements in the security film. The security film's array of focusing elements is treated with an anti-viscid agent.

In a third example embodiment, a security device comprising (i) a carrier film, (ii) a security film and (iii) a transfer film, where the security film is disposed between the carrier film and the transfer film. The security film is coupled directly to a transfer layer disposed between the transfer film and the security film. The array of focusing elements are treated with an anti-viscid agent. The security film comprises an array of image elements in the form of printed micro-structures constituting an ink.

In a fourth example embodiment, a security device is provided comprising (i) a secured product substrate, (ii) a security film and (iii) a transfer film. The security film comprises an array of image elements coupled directly to an array of focusing elements where the focal point of the focusing elements focuses within the range of the image elements depths (ranging from 0.5 to 5 μm). The array of focusing elements are coupled directly to the transfer formulation layer which is in turn coupled to a primer layer disposed between transfer formulation layer and the bf2 film (92 gauge). Here, as in some of the embodiments described throughout, the focusing elements are coupled to the transfer formulation layer such that a negative shape of the focusing elements are formed in the transfer formulation. The array of focusing elements are treated with an anti-viscid agent forming an integrated pattern within the focusing elements. Here, the secured product is a banknote and the security device is transferred to the substrate as a patch.

In certain embodiments of a first set of embodiments, a security device comprises a security film (130) comprising (i) an array of image elements (103), (ii) an array of focusing elements (106), and (iii) at least one anti-viscid agent (115), wherein the array of focusing elements and the array of image elements are disposed relative to each other such that a synthetic image is projected by the security film when at least a portion of the array of image elements are viewed through at least a portion of the array of focusing elements; and wherein the anti-viscid agent is coupled with the array of focusing elements.

According to various embodiments, an optical spacer is disposed between the array of image elements and the array of focusing elements.

In some embodiments of the first set of embodiments, a security device includes an optical spacer having a relief structure.

In some embodiments of the first set of embodiments, the optical spacer and the array of image elements each have a width and the width of the optical spacer is less than the width of the array of image elements.

In at least one embodiment within the first set of embodiments, the array of focusing elements has a first repeat period and the relief structure has a second repeat period and the first repeat period is larger than the second repeat period.

According to various embodiments of the first set of embodiments, the image elements are organized in repeating pattern of full images, portions of images or frames.

In various embodiments within the first set of embodiments, the image elements are microstructures.

According to some embodiments within the first set of embodiments, the micro-structures comprise at least one of voids and solid regions.

In some embodiments within the first set of embodiments, the security device further comprises a contrasting material coupled to the array of image elements.

In certain embodiments within the first set of embodiments, a contrasting material is at least one of a pigmented material or a reflective material. Further, in some embodiments, the contrasting material is an ink disposed within microstructure voids forming the image elements.

According to some embodiments within the first set of embodiments, a contrasting material comprises aluminum disposed within microstructure voids forming the image elements.

In various embodiments within the first set of embodiments, a security device includes focusing elements having a base diameter of less than 50 um.

According to various embodiments within the first set of embodiments, the focusing elements are arranged as an array of hexagonal sub-sets where each side of the hexagon comprises at least two focusing elements.

In at least one embodiment within the first set of embodiments, the focusing elements are embedded.

In various embodiments according to the first set of embodiments, the focusing elements comprise grin lenses.

In certain embodiments according to the first set of embodiments, the focusing elements have at least one of a polygonal base and an aspherical body.

According to some embodiments within the first set of embodiments, the focusing elements have an F number of less than 4.

In various embodiments within the first set of embodiments, the array of focusing elements have a refractive index ranging from about 1.0 to about 2.5.

According to at least one embodiment within the first set of embodiments, the anti-viscid agent is a non-ionic surfactant.

According to various embodiments within the first set of embodiments, the anti-viscid agent is also coupled to at least one of the optical spacer and the array of image elements.

In certain embodiments within the first set of embodiments, the anti-viscid agent is a surfactant having multiple ester groups.

In some embodiments according to the first set of embodiments, a security device further comprises at least one of: a carrier film, a transfer film, and a secured product substrate wherein when the carrier film is present it is coupled to the security film on the side proximate the array of image elements and when the transfer film is present it is coupled to the security film on the side opposite the array of image elements, and wherein when the secured product substrate is present, it is coupled to the security film on the side proximate the array of image elements and the carrier film is absent.

In various embodiments within the first set of embodiments, the carrier film comprises a bf1 base film, and optionally at least one of a sub-coat layer and an anti-block element.

In certain embodiments according to the first set of embodiments, the carrier film comprises a bf1 base film and having a first sub-coat layer coupled to a first side and a second sub-coat layer coupled to a second side and having an anti-block element coupled to the second sub-coat layer.

According to some embodiments within the first set of embodiments, the transfer film comprises a bf2 base film, and optionally at least one of an anti-block element, and at least one sub-coat layer.

According to certain embodiments in the first set of embodiments, a security device further comprises at least one of a primer layer, a transfer formulation layer and a primer-transfer formulation bi-layer, coupled to one of the sub-coat layer opposing the anti-block element.

In various embodiments according to the first set of embodiments, the transfer film comprises a bf2 base film and having a first sub-coat layer coupled to a first side and a second sub-coat layer coupled to a second side and having an anti-block coupled to the second sub-coat layer, and the primer-transfer formulation bi-layer is disposed between the transfer film and the security film.

In at least one embodiment of the first set of embodiments, the security film is coupled to the secured product substrate by an adhesive element disposed between the security film and the secured product substrate.

In various embodiments within the first set of embodiments, the transfer film further comprises a primer layer disposed between the transfer film and the security film.

In a second set of embodiments according to the present disclosure, a method of forming a security device comprises providing a security film (130) by (i) layering an array of focusing elements (106) over an array of image elements (103) such that a synthetic image is projected by the security film when the array of image elements are viewed through the array of focusing elements and (ii) coupling an anti-viscid agent (115) to the focusing elements.

In various embodiments according to the second set of embodiments, a method further comprises at least one of: integrating the security film with a carrier film, integrating the security film with a transfer film, and integrating a secured product substrate, wherein when the carrier film is integrated with the security film, it is coupled to the security film on the side proximate the array of image elements and when the transfer film is present it is coupled to the security film on the side opposite the array of image elements, and wherein when the secured product is integrated it is coupled to the security film on the side proximate the array of image elements and the carrier film is absent.

In various embodiments, a security device within the first set of embodiments is produced by a method of the second set of embodiments.

In a third set of embodiments, a secured product comprises a secured product substrate (822), and a security film (820) having an anti-viscid agent (825), wherein the security film is coupled to the secured product substrate.

A secured product according to the third set of embodiments, wherein an adhesive element is disposed between the secured product substrate and the security film.

According to a fourth set of embodiments, a method of forming a secured product includes providing a security film (130); and coupling the security film to a secured product substrate (120).

A secured product according to the third set of embodiments formed by a method within the fourth set of embodiments.

Use of the security device of the first set of embodiments to secure a secured product.

A secured product within the third set of embodiments, wherein the secured product substrate is a banknote.

The use of a secured product incorporating a security device of the first set of embodiments, wherein the secured product is a banknote.

A security device within the first set of embodiments, wherein the array of focusing elements has a focusing width, the spacer layer has a spacer width, the array of image elements has an image width and the carrier film has a carrier width such that the carrier width is greater than the image width, which is in turn, greater than the spacer width, which is in turn, greater than the focusing width.

The examples and embodiments provided herein are exemplary of the invention provided in the following claims.

What is claimed is:

1. A security device, comprising:

a security film comprising an array of image elements;

an array of focusing elements; and at least one anti-viscid agent, wherein the anti-viscid agent comprises a surfactant, wherein the array of focusing elements and the array of image elements are disposed relative to each other such that a synthetic image is projected by the security film when at least a portion of the array of image elements are viewed through at least a portion of the array of focusing elements, and wherein the anti-viscid agent is provided on an outside surface of the array of focusing elements, and wherein the anti-viscid agent does not substantially affect a focal length of the array of focusing elements.

2. The security device of claim 1, further comprising an optical spacer disposed between the array of image elements and the array of focusing elements.

3. The security device of claim 1, wherein the array of focusing elements has a first repeat period and the array of image elements has a second repeat period and the first repeat period is larger than the second repeat period.

4. The security device of claim 1, wherein the array of image elements comprise at least one of microstructured voids and microstructured solid regions.

5. The security device of claim 1, further comprising a contrasting material coupled to the array of image elements.

6. The security device of claim 5, wherein the contrasting material is an ink disposed within microstructured voids, forming image elements of the array of image elements.

7. The security device of claim 1, wherein the anti-viscid agent is a non-ionic surfactant.

8. The security device of claim 1, wherein the anti-viscid agent is a surfactant having multiple ester groups.

9. The security device of claim 1, further comprising at least one of:

a carrier film;

a transfer film; and a secured product substrate, wherein when the security device comprises the carrier film, the carrier film is coupled to the security film on a side of the security film which is proximate to the array of image elements, when the security device comprises the transfer film, the transfer film is coupled to the security film on a side of the security film opposite the array of image elements, and wherein, when the security device comprises the secured product substrate, the secured product substrate is coupled to the security film on the side of the security film which is proximate to the array of image elements, and the carrier film is absent.

10. The security device of claim 9, wherein the carrier film comprises a bf1 base film.

11. The security device of claim 9, wherein the carrier film comprises a bf1 base film having a first sub-coat layer coupled to a first side of the bf1 base film and a second sub-coat layer coupled to a second side of the bf1 base film, and an anti-block element coupled to the second sub-coat layer.

12. The security device of claim 11, further comprising at least one of a primer layer, a transfer formulation layer and a primer-transfer formulation bi-layer, coupled to one of the first sub-coat layer or the second sub-coat layer and opposing the anti-block element.

13. The security device of claim 12, wherein the transfer film comprises a bf2 base film and having a first sub-coat layer coupled to a first side and a second sub-coat layer coupled to a second side and having an anti-block coupled to the second sub-coat layer; and wherein the primer-transfer formulation bi-layer is disposed between the transfer film and the security film.

14. The security device of claim 9, wherein the transfer film comprises a bf2 base film and at least one sub-coat layer.

15. The security device of claim 9, wherein the security film is coupled to the secured product substrate by an adhesive element disposed between the security film and the secured product substrate.

16. The security device of claim 9, wherein the transfer film further comprises a primer layer disposed between the transfer film and the security film.

17. A method of forming a security device, the method comprising:

providing a security film by layering an array of focusing elements over an array of image elements such that a synthetic image is projected by the security film when the array of image elements are viewed through the array of focusing elements and coupling an anti-viscid agent to an outside surface of focusing elements of the array of focusing elements, wherein the anti-viscid agent comprises a surfactant, and wherein the anti-viscid agent does not substantially affect a focal length of the array of focusing elements.

18. The method of claim 17, further comprising at least one of:

integrating the security film with a carrier film; and integrating the security film with a transfer film, integrating a secured product substrate, wherein when the carrier film is integrated with the security film, the carrier film is coupled to the security film on a side of the security film which is proximate to the array of image elements, when the security device comprises the transfer film, the transfer film is coupled to the security film on a side of the security film opposite the array of image elements, and wherein when the secured product substrate is integrated it is coupled to the security film on the side proximate the array of image elements and the carrier film is absent.

* * * * *